Dec. 9, 1958
N. SCHMITT
2,864,014
VENTILATION OF THE INNERMOST COIL OF A
GENERATOR ROTOR WINDING
Filed Aug. 7, 1957
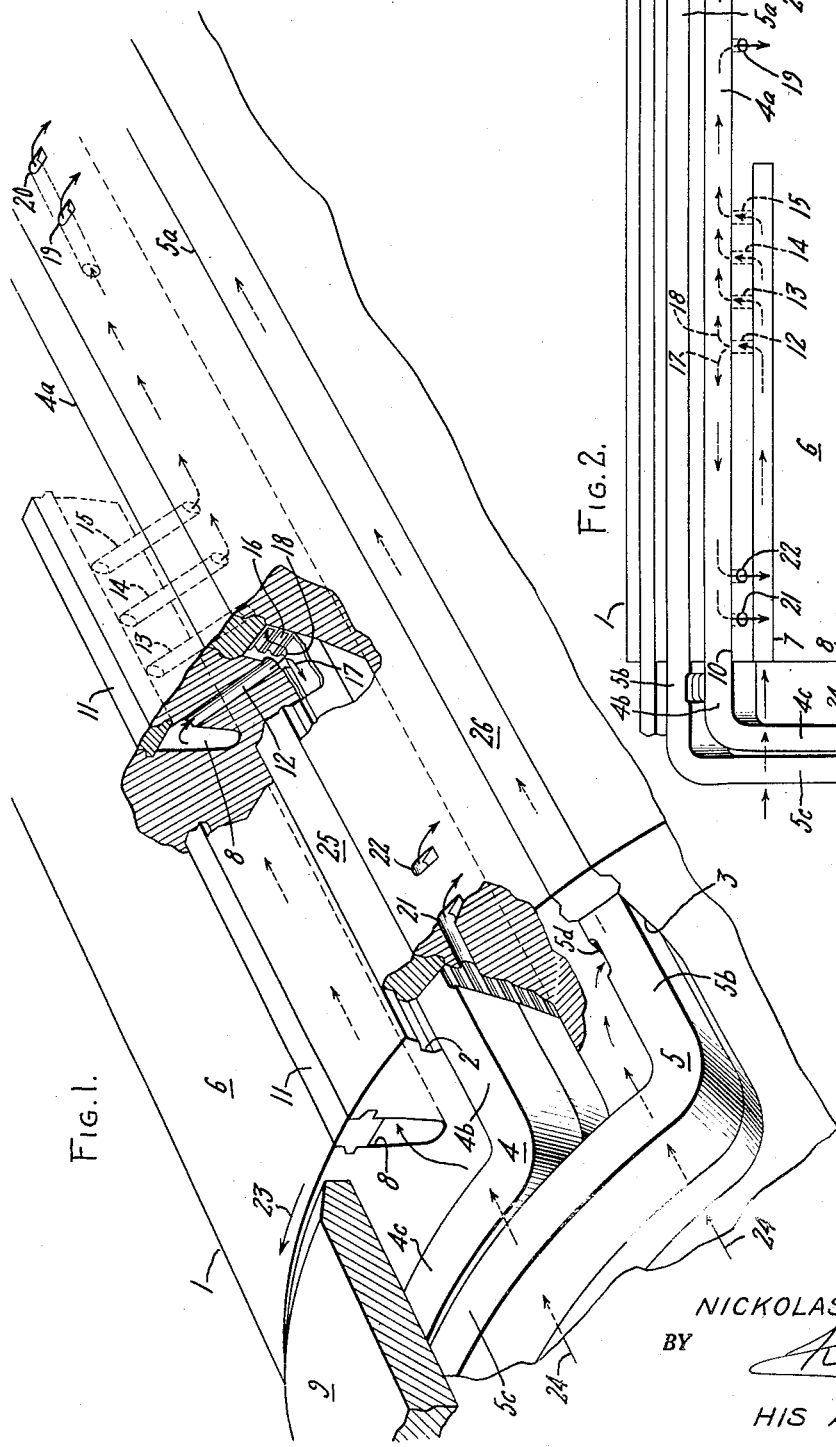
INVENTOR.
NICKOLAS SCHMITT
BY
HIS ATTORNEY 2,864,014

VENTILATION OF THE INNERMOST COIL OF A GENERATOR ROTOR WINDING

Nickolas Schmitt, Scotia, N. Y., assignor to General Electric Company, a corporation of New York Application August 7, 1957, Serial No. 676,830

4 Claims. (Cl. 310—61)

This invention relates to dynamoelectric machines, and more particularly to a method for cooling the slot portion of the innermost coil of a generator rotor.

It is well known that one of the main factors limiting the output of a large dynamoelectric machine, such as a turbine generator, is the rise in temperature of the windings. In large generators, the rotor coils are made up of axial slot portions interconnected by circumferentially extending end portions. The slot lying portions have recently been cooled by placing the coolant gas in direct contact with the conductor to more effectively dissipate the heat from the windings. At the same time the end turns have been cooled by freely circulating cooling air. In a rotor cooled in this manner, the cooling air is first directed under the coils which are held against centrifugal forces by retaining rings, where it cools the end turns by convection. The cooling air then enters ports in the axial portions of the conductors adjacent the rotor body. From these ports, the cooling gas is carried through the conductors in the coil slots to an intermediate portion of the rotor, and then exhausted to the air space located between the rotor and stator which is commonly referred to as the "air gap." This arrangement necessitates openings in the portion of the end turns adjacent the rotor body to admit cooling air to the coils. These openings are located in the axial section of the end turns to minimize the pressure required to provide sufficient mass flow of cooling gas within the coils. The axial section of the end turns available for the required inlet openings depends on a number of factors including the number of coils, and the necessity of maintaining a predetermined axial distance between the end of the rotor and the "centering ring" or radially extending flange on which the retaining ring is supported. The factors which limit the axial length of the retaining ring are not important to the present invention, other than to note that the retaining ring limits the axial dimensions of the end turns to where the axially extending end turn portions of the coil immediately adjacent the pole center may be too short to permit locating inlet ports therein. The limited axial length of the end turn of the coil immediately adjacent the pole center which will be hereinafter referred to as the innermost coil, has resulted in locating the inlet ports for the slot sections of the coil in the coil corners. This location is not preferred since the corners are subject to fatigue stresses due to the flexing of the coils during load changes on the generator. This flexing results from the differential thermal expansion of the axial portions of the coils relative to the circumferential portions which are fixed against axial movement by blocks located between adjacent coils. Locating the inlet ports in the coil corners where flexing occurs may result in fatigue failure and thus reduce the life of the coil.

Accordingly, it is an object of this invention to provide an improved arrangement for cooling the end sections of the slot lying portion of the innermost coil of a direct-cooled rotor winding.

Other objects and advantages will become apparent from the following description and accompanying drawings in which—

Fig. 1 is a perspective view, partially in section, illustrating one end of a rotor in which an axial portion of the innermost coil winding is cooled in accordance with my invention; and Fig. 2 is a plan view disclosing the arrangement for cooling both axial end portions of the innermost winding coil.

Generally stated, the invention is practiced by admitting cooling gas to the slot portions of the coil immediately adjacent the pole center at the rotor ends through special ventilating slots cut in the pole center and passages in the rotor extending between the slots and the cooling passage in the conductor bar.

In Fig. 1, the invention is illustrated as applied to a rotor 1 of a two-pole synchronous dynamoelectric machine, having coil receiving slots 2, 3, etc., and a distributed, hollow conductor, direct current field winding. Each pole of the field winding comprises a plurality of concentric coils 4, 5, etc., spanning the pole center 6.

Referring now more particularly to Fig. 1, there is illustrated coil 4 which is closest to pole center 6 and which is cooled in accordance with my invention, and concentrically disposed coil 5. Coils 4, 5 are retained in place in the slot by wedges 25, 26 and comprise axially extending slot lying portions 4a, 5a and end turns at each end of the rotor having axially and circumferentially extending portions 4b, 5b, and 4c, 5c, respectively. The end turns are fixed against radial movement by retaining ring 9 and against axial movement by a centering ring (not shown). For clarity, only two of the concentrically disposed rotor coils 4, 5 are shown; although in practice several more are used. Also, while only one end of the rotor is disclosed in Fig. 2, a similar construction is found at the other end. Coil 4 is shown as comprising a plurality of rectangular tubes, but it is obvious that the invention is suitable to any coil construction in which the cooling gas flows in direct contact with the metal of the conductor.

As previously mentioned, the end turn portions 4b, 4c, and 5b, 5c of coils 4, 5, respectively are cooled by "free convection" whereas the slot lying portions 4a, 5a of the coils 4, 5 are cooled by cooling gas admitted to the interior of the coil conductors near the end of the rotor body and exhausting it intermediate the ends of the rotor. As shown in Figs. 1 and 2 coil 5 and the other coils (not shown) located outwardly therefrom have inlet ports 5d in the axially extending end portions 5b immediately adjacent the end of rotor 1. Thus gas enters ports 5d, flows axially through coil 5 in the rotor slot 3 to outlet ports (not shown) located intermediate the ends of the rotor 1. However, while such ports can be readily machined in the axial portion 5a of coil 5, the short axial length of end turn 4b does not provide enough space in which to locate inlet ports therein without locating them in the corner of the end turn. Such a location is not desirable since it increases the stresses in a portion of the coil where stresses are set up due to flexing of the coils during load change.

To prevent additional stressing of the end turns 4b, 4c the slot portion 4a of the innermost coil 4 is cooled in accordance with my invention. The invention includes the provision of slots 7, 8 in pole center 6 adjacent slots 2, 10 respectively which contain the slot lying portions 4a of coil 4 (see Fig. 2). The slots 7, 8 extend axially from the end of the rotor approximately one-half the length of the portion of the coil in slots 2, 10 to be cooled by cooling gas entering at the rotor ends. In the embodiment shown, and the one for which the invention is particularly adapted, only a short section of the coil in slots 2, 10 at the ends of the rotor body is cooled by the gas supplied from the rotor ends. The main intermediate portion of the rotor is cooled by air admitted from the air gap surrounding that portion of the rotor. The particular details of the arrangement for cooling the rotor in this "air-gap pickup" manner are not shown, since they are not part of the present invention and a cooling scheme of this type is more particularly described in U. S. Patent 2,791,707, issued May 7, 1957, to D. M. Willyoung and assigned to the assignee of the present invention.

Slot 8 is closed at its outer end by a wedge 11 to define a gas passage. The gas in slot flows into diagonal ducts 12, 13, 14, 15 formed in the rotor adjacent the coil slot, and through openings 16 cut through the ground insulation (not shown) and conductor bar into the slot section 4a of coil 4. Openings 12, 13, etc. are located intermediate the ends of the slot section to be cooled and the gas admitted into coil 4 flows in both directions as indicated by arrows 17, 18. The cooling gas flowing toward the center of the rotor is exhausted through diagonal outlet ducts 19, 20 in the rotor adjacent the inner end of the portion of the coil to be cooled, and the gas flowing toward the end of the rotor exhausts through diagonal outlet ducts 21, 22 cut in the rotor 1 adjacent the end thereof. The rotation of rotor 1 is indicated by arrow 23. As indicated by arrow 24, the gas for cooling the coils comes in underneath the retaining ring 9 and the coil end turns and is pumped outwardly due to the rotor rotation which accelerates the gas as it moves from a smaller to a larger diameter (the rotor surface), much like the action of a centrifugal fan. The pressure head created by this pumping action directs the gas down slots 8, through ducts 12, 13, etc., and opening 16 into coil 4. Outlet ducts 19, 20, 21, 22 are designed so that rotation of rotor 1 results in a decreased pressure adjacent the ducts 19, 20, etc. which aids in the evacuation of the cooling gas from coil 4. The axial portion of coil 4 located in slot 10 is cooled by gas entering slot 7 in a manner similar to that described above.

Thus it can be seen that the slot lying sections of the innermost coil adjacent the end of the rotor is cooled by gas admitted thereto from auxiliary slots cut into the pole center and that the end turns of the coils are not weakened by requiring that openings be formed in the corner portions of the end turns.

It will be obvious to those skilled in the art that changes and substitutions of equivalents might be made in the construction of the rotor ventilating scheme disclosed herein. It is, of course, desired to cover by the appended claims all such modifications as fall within the true spirit and scope of the invention.

What I claim as new and desire to secure by Letters Patent of the United States is:

1. A dynamoelectric machine rotor core member having winding slots, a distributed hollow conductor field winding disposed in said slots, each pole of the field winding having a plurality of concentric coils spanning the pole center, the pole center portion of the rotor defining first axial passage means opening through the end of the rotor, the rotor and portions of the innermost coil immediately surrounding the pole center defining second passage means interconnecting the first passage means and said innermost coil for admitting cooling gas therein to cool the axial end portions of the innermost coil, and outlet passage means defined by the rotor for venting the cooling gas from said innermost hollow conductor after it has cooled the axially extending end portions of the innermost coil.

2. A dynamoelectric machine rotor core member having winding slots, a distributed hollow conductor direct current field winding disposed in said slots, each pole of the field winding having a plurality of concentric coils spanning the pole center and having end windings disposed outside the ends of the rotor core member, a retaining ring surrounding the end turns for maintaining them in place against the action of centrifugal forces, the end turns and rotor defining a cooling gas intake space therebetween, the pole center defining first passage means in the ends of the rotor for receiving cooling gas from said intake space, the rotor and first coil located immediately adjacent the pole center defining second passage means between said first passage means and the interior of the adjacent coil, whereby cooling gas may be supplied to the end portion of the slot lying section of the first coil for cooling it, and outlet means defined by the rotor for exhausting the cooling gas from said first coil after cooling the slot lying end portions.

3. A dynamoelectric machine rotor core member having winding slots, a distributed hollow conductor direct current rotor winding disposed in said slots, each pole of the rotor winding having a plurality of concentric coils spanning the pole center and having end windings disposed outside the ends of the rotor core member, a retaining ring surrounding the end turns for maintaining them in place against the action of centrifugal forces, the end turns and rotor defining a cooling gas intake space therebetween which receives cooling gas for cooling the end turns by convection, the pole center defining first notch means at the end of the rotor body for receiving cooling gas from said intake space, wedge means covering said notch means, gas inlet means defined by said rotor between the notch means and the coil immediately adjacent the pole center for cooling the slot lying end portions of said coil, and diagonal outlet passage means defined by the rotor core member for exhausting the cooling gas from the portion of said coil cooled by gas entering from the notch means.

4. A dynamoelectric machine rotor core member having winding slots, a distributed hollow conductor field winding disposed in said slots, each pole of the field winding having a plurality of concentric coils spanning the pole center, the pole center portion of the rotor defining first axial passage means opening through the end of the rotor, the rotor and portions of the innermost coil immediately surrounding the pole center defining second passage means interconnecting the first passage means and an intermediate portion of an axial section of the innermost coil to be cooled whereby the gas flows in both directions through the hollow conductor, and outlet passage means defined by the rotor at the ends of the section of the innermost coil cooled by the gas admitted through said second passage means for venting the cooling gas.

References Cited in the file of this patent
UNITED STATES PATENTS 2,724,064    Kilner _____ Nov. 15, 1955

FOREIGN PATENTS 714,319    France _____ Sept. 1, 1931
1,091,810  France _____ Nov. 3, 1954